US009296271B2

(12) United States Patent
Mevorach et al.

(10) Patent No.: US 9,296,271 B2
(45) Date of Patent: *Mar. 29, 2016

(54) BALL JOINT FOR AUTOMOTIVE SUSPENSION

(71) Applicant: MEVOTECH INC., Toronto (CA)

(72) Inventors: Ezer Mevorach, Toronto (CA); Rosan Luiz, Toronto (CA)

(73) Assignee: MEVOTECH LP, Toronto, Ontario (CA)

( * ) Notice: Subject to any disclaimer, the term of this patent is extended or adjusted under 35 U.S.C. 154(b) by 105 days.

This patent is subject to a terminal disclaimer.

(21) Appl. No.: 14/219,232

(22) Filed: Mar. 19, 2014

(65) Prior Publication Data

US 2014/0205366 A1 Jul. 24, 2014

Related U.S. Application Data

(63) Continuation-in-part of application No. 13/296,590, filed on Nov. 15, 2011, now Pat. No. 8,714,862.

(51) Int. Cl.
| | | |
|---|---|---|
| *F16C 11/00* | (2006.01) | |
| *B60G 7/00* | (2006.01) | |
| *F16C 11/06* | (2006.01) | |

(52) U.S. Cl.
CPC ............ *B60G 7/005* (2013.01); *F16C 11/0642* (2013.01); *F16C 11/0647* (2013.01); *F16C 11/0685* (2013.01); *F16C 11/0628* (2013.01); *Y10T 403/32811* (2015.01)

(58) Field of Classification Search
CPC ............ F16C 11/0628; F16C 11/0642; F16C 11/0647; F16C 11/0685; Y10T 403/32655; Y10T 403/32688; Y10T 403/32811; Y10T 403/32852; B60G 7/005

USPC ......... 403/122, 123, 125, 129, 130, 135, 138, 403/140, 144, 154, 161, 166
See application file for complete search history.

(56) References Cited

U.S. PATENT DOCUMENTS

| | | | |
|---|---|---|---|
| 2,305,265 | A | 12/1942 | Tourneau |
| 3,027,182 | A | 3/1962 | Reuter |
| 3,013,370 | A | 9/1963 | Krizman |
| 3,216,754 | A | 11/1965 | Smith et al. |
| 4,121,844 | A | 10/1978 | Nemoto et al. |
| 5,066,159 | A | 11/1991 | Urbach |
| 5,309,541 | A | 5/1994 | Flint |
| 5,601,378 | A | 2/1997 | Fukukawa et al. |
| 5,653,545 | A | 8/1997 | Moormann et al. |
| 6,042,293 | A | 3/2000 | Maughan |
| 6,102,604 | A | 8/2000 | Maughan |
| 6,530,711 | B2 | 3/2003 | Menotti |
| 6,840,697 | B1 | 1/2005 | Dorr |
| 8,047,739 | B2 | 11/2011 | Sellers et al. |
| 8,151,464 | B2 | 4/2012 | Orend |
| 2008/0056811 | A1 | 3/2008 | Urbach |

*Primary Examiner* — Gregory Binda
*Assistant Examiner* — Nahid Amiri
(74) *Attorney, Agent, or Firm* — Norton Rose Fulbright Canada LLP; Paul J. Field

(57) ABSTRACT

A ball joint comprising: a housing having an inner cavity defined inward of a seat end, a side wall and a closure end having an opening, an edge about the opening in an assembly position extending upwardly; a ball stud having: a lower ball end with an outer convex spherical surface, a middle portion, and a connector end; a first bearing, slidably housed within the cavity, having an inner concave spherical surface; a retention plate, housed within the cavity inward of the edge about the opening, wherein the edge of the opening extends inwardly engaging an outer surface of the retention plate in a closed position; and a first disc annular recess in at least one of: an outward surface of the first bearing; and an inward surface of the retention plate.

16 Claims, 13 Drawing Sheets

US 9,296,271 B2

BALL JOINT FOR AUTOMOTIVE SUSPENSION

RELATED APPLICATION

This application is a Continuation-in-Part of U.S. patent application Ser. No. 13/296,590 filed Nov. 15, 2011.

TECHNICAL FIELD

The invention relates to a ball joint for use in an automotive suspension system or the like having at least one spring loaded bearing.

BACKGROUND OF THE ART

The use of ball joints allows pivoting movement of suspension components relative to each other while retaining the capacity to transmit axial and shear forces to accommodate steering movement and maintain wheel alignment for example.

Ball joints include a stud with a spherical ball end that is mounted within spherical bearings in a housing. Wear between the ball end and bearings is reduced by use of grease. However wearing of the contact surfaces of bearings and/or the ball end eventually does occur and the clearance between engaging spherical surfaces occurs.

It is desirable to provide a compensating mechanism to maintain a close clearance between the spherical surfaces when wear occurs.

It is desirable to extend the cycle life of the ball joint, to avoid overstressing of the ball joint components, and to maintain components in their proper alignment during use.

Features that distinguish the present invention from the background art will be apparent from review of the disclosure, drawings and description of the invention presented below.

DISCLOSURE OF THE INVENTION

The invention provides a ball joint comprising: a housing having an inner cavity defined inward of a seat end, a side wall and a closure end having an opening, an edge about the opening in an assembly position extending upwardly; a ball stud having: a lower ball end with an outer convex spherical surface, a middle portion, and a connector end; a first bearing, slidably housed within the cavity, having an inner concave spherical surface; a retention plate, housed within the cavity inward of the edge about the opening, wherein the edge of the opening extends inwardly engaging an outer surface of the retention plate in a closed position; a first disc annular recess disposed in at least one of: an outward surface of the first bearing; an inward surface of the retention plate; and an inward surface of the seat end of the housing, and a first disc spring disposed in the first disc annular recess, the first disc annular recess laterally restraining at least one of: an outer circular edge of the first disc spring; and an inner circular edge of the first disc spring, during compression of the first disc spring, and a peripheral annular shoulder adjacent the first disc annular recess axially limiting axial movement, between the outer surface of the first bearing; and one of: the inner surface of the retention plate; and the inward surface of the seat end of the housing, thereby limiting compression of the first disc spring.

DESCRIPTION OF THE DRAWINGS

In order that the invention may be readily understood, one embodiment of the invention is illustrated by way of examples in the accompanying drawings.

Further details of the invention and its advantages will be apparent from the detailed description included below.

DETAILED DESCRIPTION OF PREFERRED EMBODIMENTS

Figure 1:
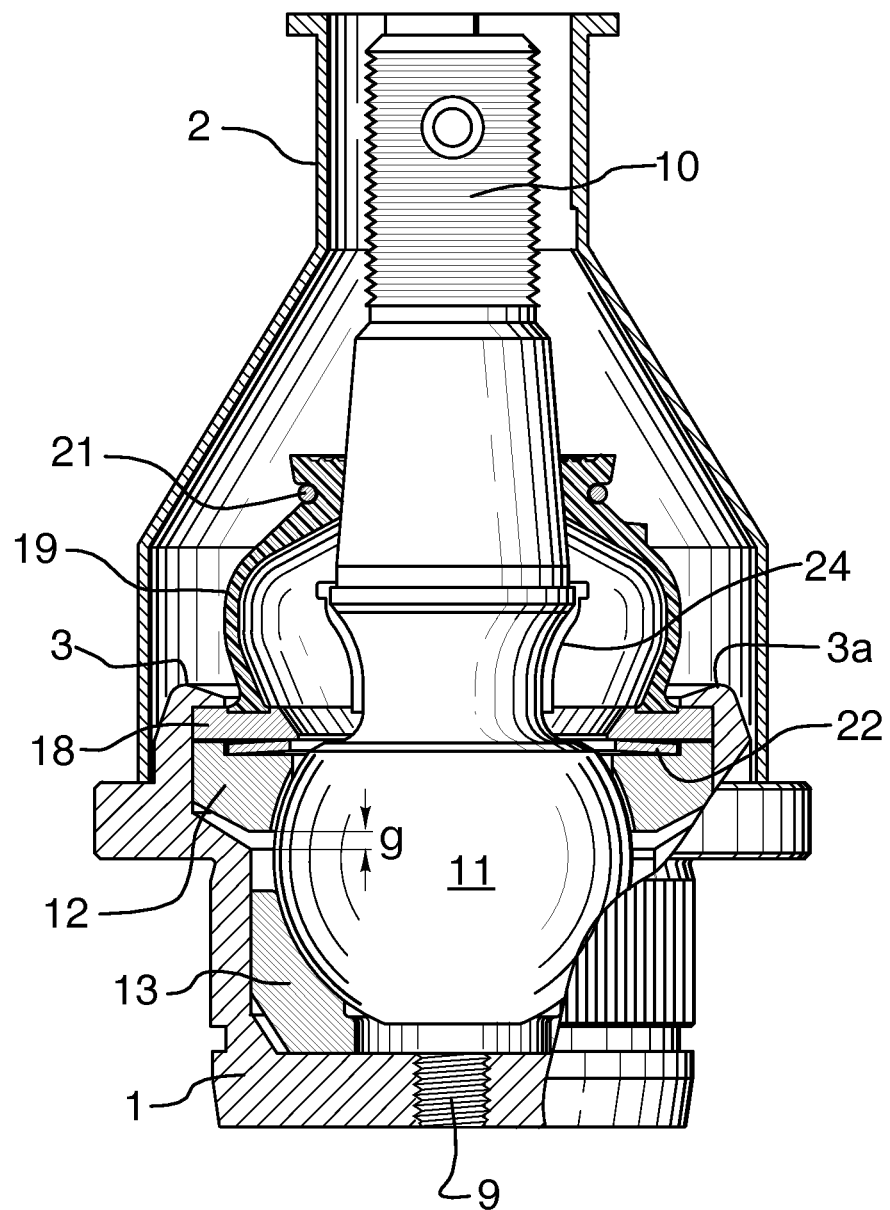
FIG. 1 is an axial partial sectional and cut-away view through a first example configuration of a ball joint as described below having a spring loaded upper bearing.
Figure 3:
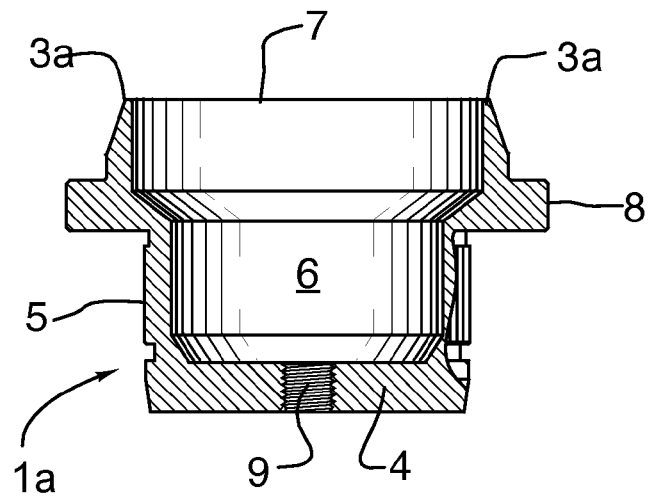
FIG. 3 is an axial sectional view through the housing of the first example.

FIG. 1 shows an axial sectional view through a first example ball joint where a cup shaped housing 1a secures all other components, except for the exterior protective sleeve 2. FIG. 1 shows the housing 1a with an upper edge 3a in the closed position and FIG. 3 shows the housing 1a with the upper edge 3a in an initial assembly position. The internal components, described below, can be inserted into the housing 1a when the upper edge 3a is in the assembly position of FIG. 3. The upper edge 3a is pressed and rolled over during manufacture into the closed position of FIG. 1 to hold and compress the interior components.

FIG. 3 shows details of the housing 1a of the first example which has a bottom wall 4, and a side wall 5 extending upward from the periphery of the bottom wall 4 to define an interior cavity 6. The cavity 6 has an upper opening 7 with the upper edge 3a about the upper opening 7. FIG. 3 shows the upper edge 3a in an assembly position extending upwardly and FIG. 1 shows the upper edge 3a after rolling over into the closed position extending laterally inwardly. The housing 1a has a flange 8 extending laterally outward from the side wall 5 of the housing 1a. The flange 8 and cylindrical outer surface of the side wall 5 serve to engage the ball joint into a socket in an automotive suspension in a standardized manner known to those skilled in the art. The bottom wall 4 also has a grease inlet 9 into which a grease nipple can be inserted to enable injection of grease into the cavity 6 for lubrication of the moving components. The dust cover 19 includes a grease vent outlet (not shown) to exude excess spent grease.

Figure 4:
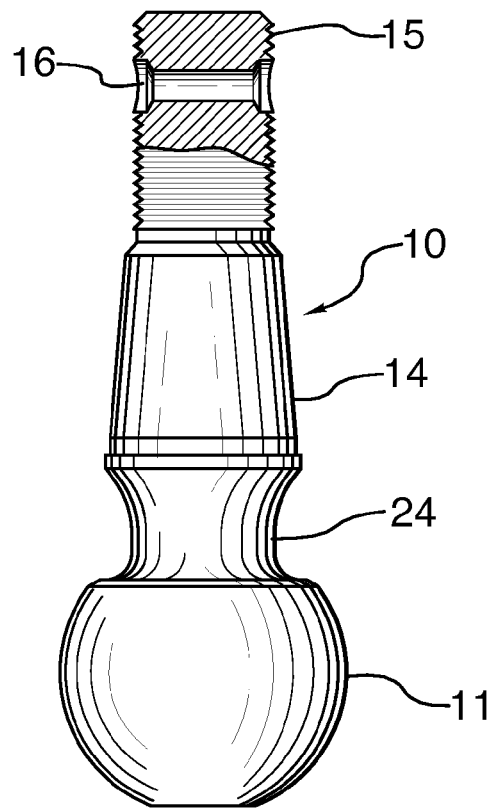
FIG. 4 is a side view of the ball stud being partially sectional at the upper end of the first example.
Figure 7A:
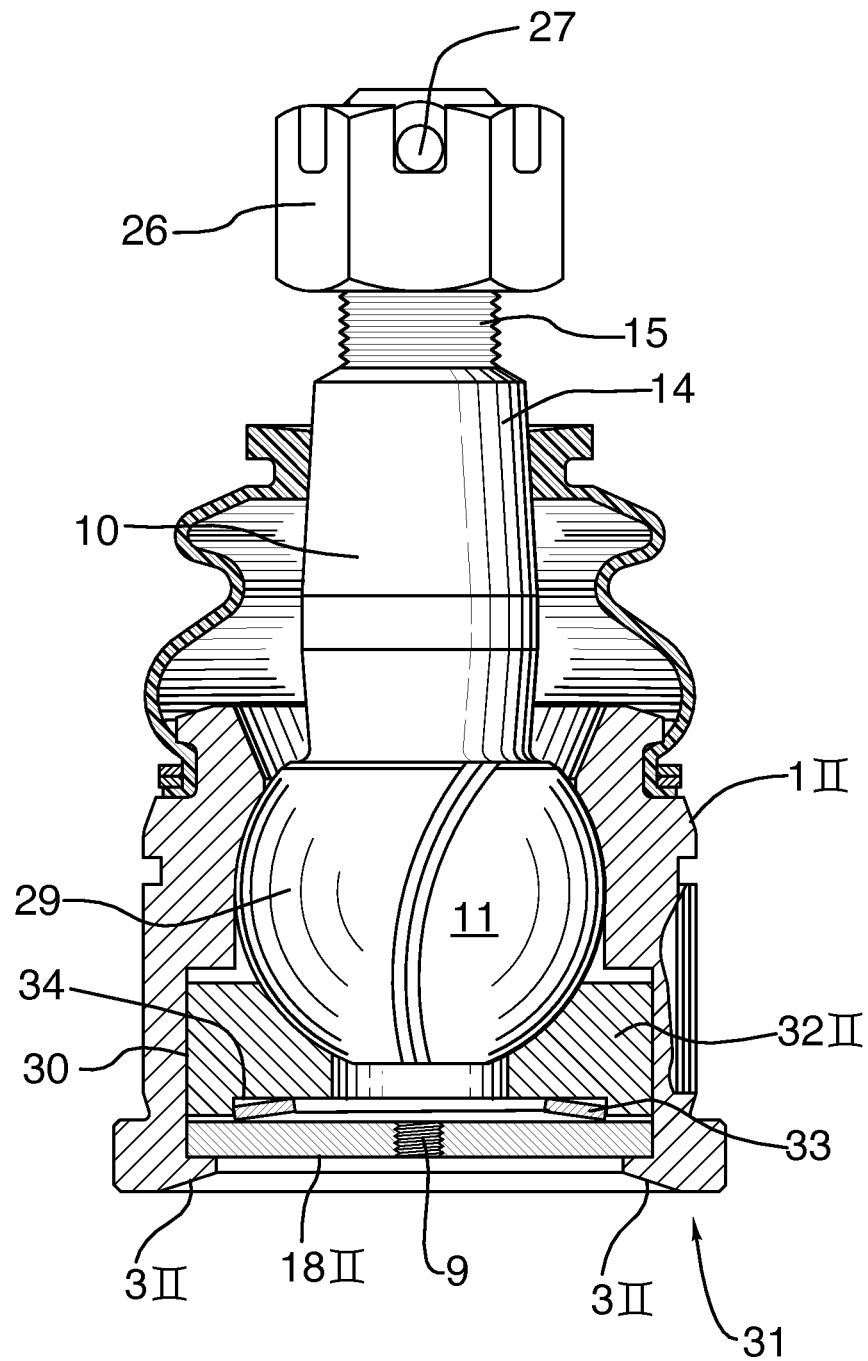
FIGS. 7a, 7b, 7c and 7d are axial partial sectional and cut-away views through a fourth example configuration of a ball joint as described below having a spring loaded lower bearing with the disc spring positioned in an annular recess that restrains the outside edge in FIGS. 7a-7b, and in FIGS. 7c-7d the inside edge is restrained by the bearing while the outside edge is restrained by the housing.

FIG. 4 shows the details of the ball stud 10 with a lower ball end 11 having an external convex spherical surface where engagement occurs with the internal concave spherical surfaces of the upper bearing 12 and lower bearing 13a. The ball stud 10 has a substantially conical middle portion 14 which may vary in length depending on the intended connection installation and clearances required. The ball stud 10 has an upper connector end 15 that may be externally threaded to receive a nut and may include a transverse bore 16 to receive a nut retention pin that prevents rotation of the nut. For instance, the fourth example shown in FIGS. 7a-7b includes a nut 26 and pin 27.

Figure 2:
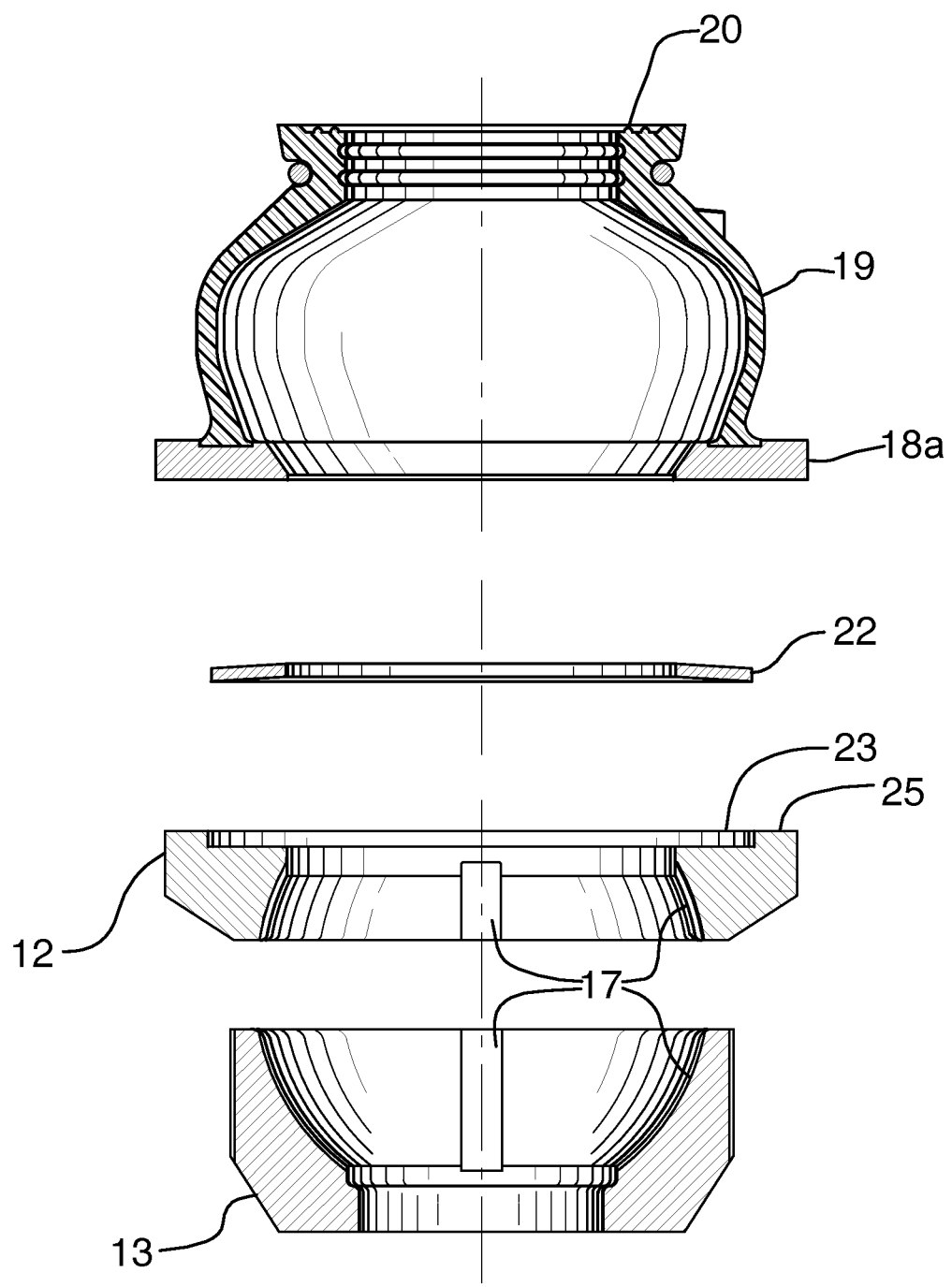
FIG. 2 is an exploded axial sectional view of the dust boot, disc spring, upper bearing and lower bearing of the first example.

Referring to FIGS. 1-2, the first example ball joint includes a separate lower bearing 13a having an inner concave spherical surface and housed within the lower portion of the housing cavity 6. The upper bearing 12 is housed within a larger diameter upper portion of the cavity 6 and has an inner concave spherical surface. As seen in FIG. 2, both bearings 12, 13a have shallow grooves 17 at 90 degree intervals to allow grease distribution over engaging surfaces of the moving parts. The lower bearing 13a is restrained axially by engagement with the bottom abutment wall 4 of the housing 1a and restrained laterally by engagement with the side wall 5 of the housing 1a. The upper bearing 12 can move axially a limited amount and slidingly engages the side wall 5 of the housing 1a. The upper bearing 12 and an inward sloped annular shoulder of the housing 1a are separated by an axial gap "g", in FIG. 1, to provide the upper bearing 12 with a limited degree of spring loaded sliding movement within the housing cavity 6.

As seen in FIGS. 1-2, an upper retention plate 18a is housed within an upper portion of the cavity 6 inward of the rolled over edge 3a. The retention plate 18a has a lower surface spaced apart from an upper surface of the upper bearing 12 by the resilient force of the disc spring 22. An upper surface of the retention plate 18a is secured by the rolled over upper edge 3a of the housing 1a when in the closed position of FIG. 1.

A flexible dust boot 19 assists in containing grease and preventing abrasive dust particles from contaminating the enclosure. The boot 19 is made of flexible rubber or polyurethane and has an upper end 20 sealed about the middle portion 14 of the ball stud 10 and having a lower end sealed to retention plate 18a. FIG. 1 shows the upper end 20 of the dust boot 19 with an exterior annular recess in which a resilient spring metal ring 21 is disposed to enhance the sealing about middle conical portion of the ball stud 10. The top surface of the retention plate 18a has an annular recess in which the lower end of the dust boot 19 is vulcanized and sealed. The retention plate 18a has a beveled inner opening and the middle portion 14 of the ball stud 10 has a concave profile portion 24 which increase the pivot range through which the ball stud 10 can swing or tilt relative to the housing 1a as indicated with dashed lines radiating from the center of the ball end 11 in FIG. 1.

As seen in FIGS. 1-2, a disc spring 22 is provided to preload and compress the upper bearing 12 downward toward the ball end 11. The preload impedes pivoting or rotation movement of the ball stud 10 until a minimum load is applied to overcome the preload and cause movement. Accurate setting of the preload can be achieved by accurate selection of the depth and diameter of the annular recess 23 and selecting the dimensions and load-displacement capacity of the disc spring 22 to suit the application.

The gap "g" between the upper bearing 12 and the lower bearing 13a permits the upper bearing 12 to be moved by the disc spring 22 downwardly to maintain close tolerances and to compensate for a degree of wear between the spherical surfaces. The disc spring 22 also maintains a relatively constant compressive force or preload on the bearings 12, 13a and ball end 11 to reduce chatter, vibration, and ultimately to prolong the service life of the ball joint.

The disc spring 22 is also commonly known as a Belleville washer, conical disc spring or cupped disc spring. Multiple disc springs 22 may be used depending on the application either stacked together within a single annular recess 23, or as illustrated in the second example of FIG. 5, located above and below the bearings 12, 13b to spring load the upper bearing 12 downward and the lower bearing 13b upward.

As shown in FIGS. 1-2, the disc spring 22 or a stack of multiple springs 22 can be held in place within an annular recess 23 in the upper surface of the upper bearing 12. It will be appreciated that an annular recess could equally be made in the lower surface of the retention plate 18a, or a relatively shallow annular recess 23 could be made in both the retention plate 18a and in the upper bearing 12.

In the first example shown in FIGS. 1-4, the upper bearing 12 has an outer diameter larger than an outer diameter of the lower bearing 13a. This provides a larger surface area over which the compressive force exerted by the disc spring 22, the retention plate 18a and the upper edge 3a can be distributed thereby lowering the compressive stress imposed on the materials from which they are made. The larger diameter and surface area also reduces the stress applied to the interior components when force is applied to the housing edge 3a to roll the edge 3a inward to secure the components.

It will be appreciated that during the rolling over of the upper edge 3a of the housing 1a, and during use of the ball joint that large forces are applied to the retention plate 18a, disc spring 22 and upper bearing 12. The annular recess 23 in the upper bearing 12 and the disc spring 22 are located in an inside portion of the upper surface of the upper bearing 12. An outer portion of the upper surface of the upper bearing 12 defines a raised peripheral shoulder 25 (see FIG. 2). The shoulder 25 abuts against the lower surface of the retention plate 18a when forces applied to the disc spring 22 exceed the force resistance capacity of the disc spring 22. The shoulder 25 protects the disc spring 22 from overstressing and ensures that stress applied to the disc spring 22 remains within the elastic deformation range for the spring material. Excessive stress on the spring 22 would result in plastic deformation which deforms the spring 25 resulting in a different force-displacement profile than the designed profile. Plastic deformation and overstressing of the spring 22 would also severely damage and reduce the life cycle of the ball joint. Maintaining deformation within an elastic range extends the spring 22 life cycle.

Accordingly, the first example arrangement described above provides spring loading of the upper bearing 12 against the ball end 11 and the lower bearing 13a which compensates for a degree of wearing and maintains compression to ensure close fitting of the moving parts. Over stressing of the disc spring 22 is prevented by providing an annular shoulder 25 to abut the underside of the retention plate 18a.

Figure 5A:
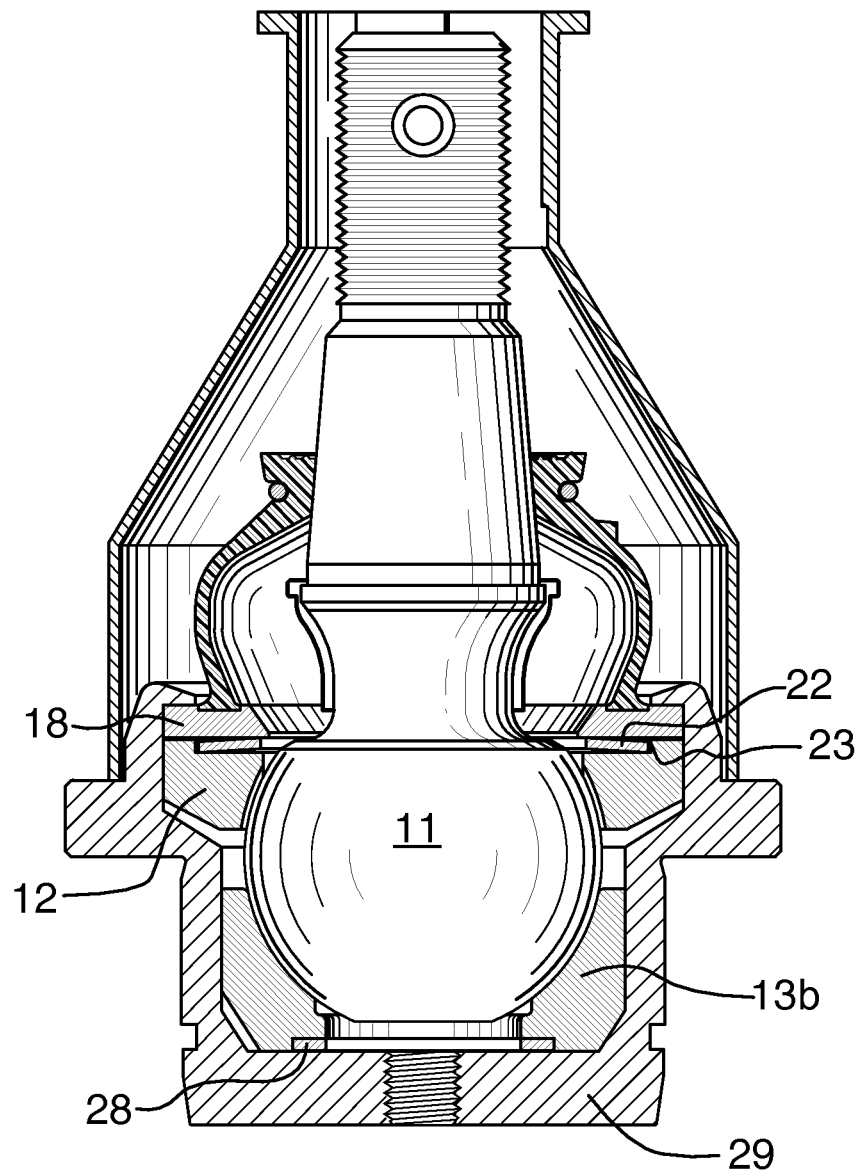
FIGS. 5a, 5b, and 5c are axial partial sectional and cut-away views through a second example configuration of a ball joint as described below having a spring loaded upper bearing and a spring loaded lower bearing with the disc springs positioned in an annular recess that restrains the outside edge, the inside edge and both edges respectively.

FIG. 5a illustrates a second example of the ball joint which is substantially identical to the first example of FIG. 1. An upper disc spring 22 is located within an annular recess 23 in the upper bearing 12. The upper disc spring 22 exerts force on the retention plate 18a and the upper bearing 12 to spring load the upper bearing 12 downwards into close engagement with the ball end 11. In a like manner, the lower portion of the ball end 11 is seated into the lower bearing 13b. The lower disc spring 28 exerts force on the housing bottom abutment wall 29 and the lower bearing 13b to spring load the lower bearing 13b upwards into close engagement with the ball end 11.

As indicated in FIGS. 5a-5c, 7a-7d and 8-9, it matters not whether the annular recess is provided in the bearing or the adjacent wall or plate or both. The disc spring is housed in a close fitting annular recess to (1) avoid overstressing and plastic deformation of the spring, (2) maintain spring load-displacement capacity and (3) maintain the spring in it's central symmetrical position relative to the ball end and other components to avoid asymmetrical loading and local overstressing of the components.

Figure 5B:
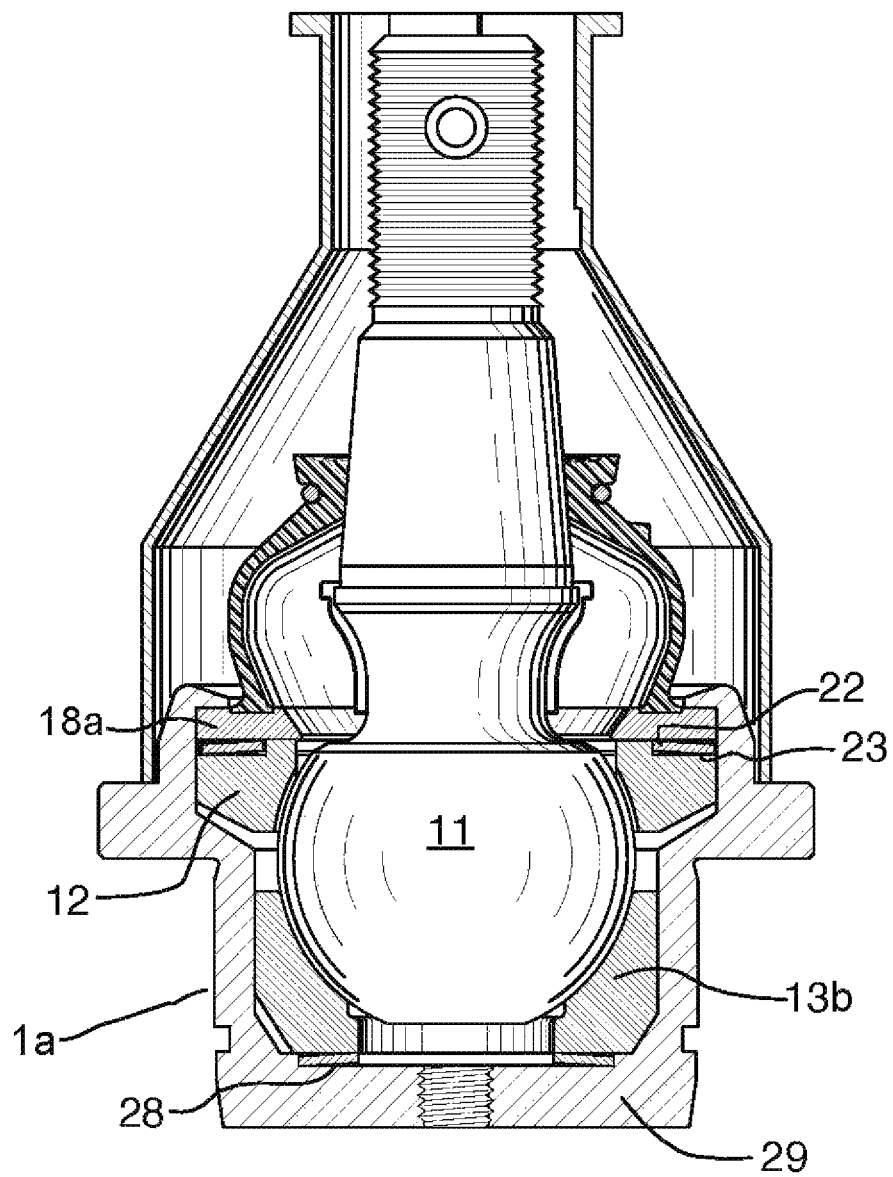
Figure 5C:
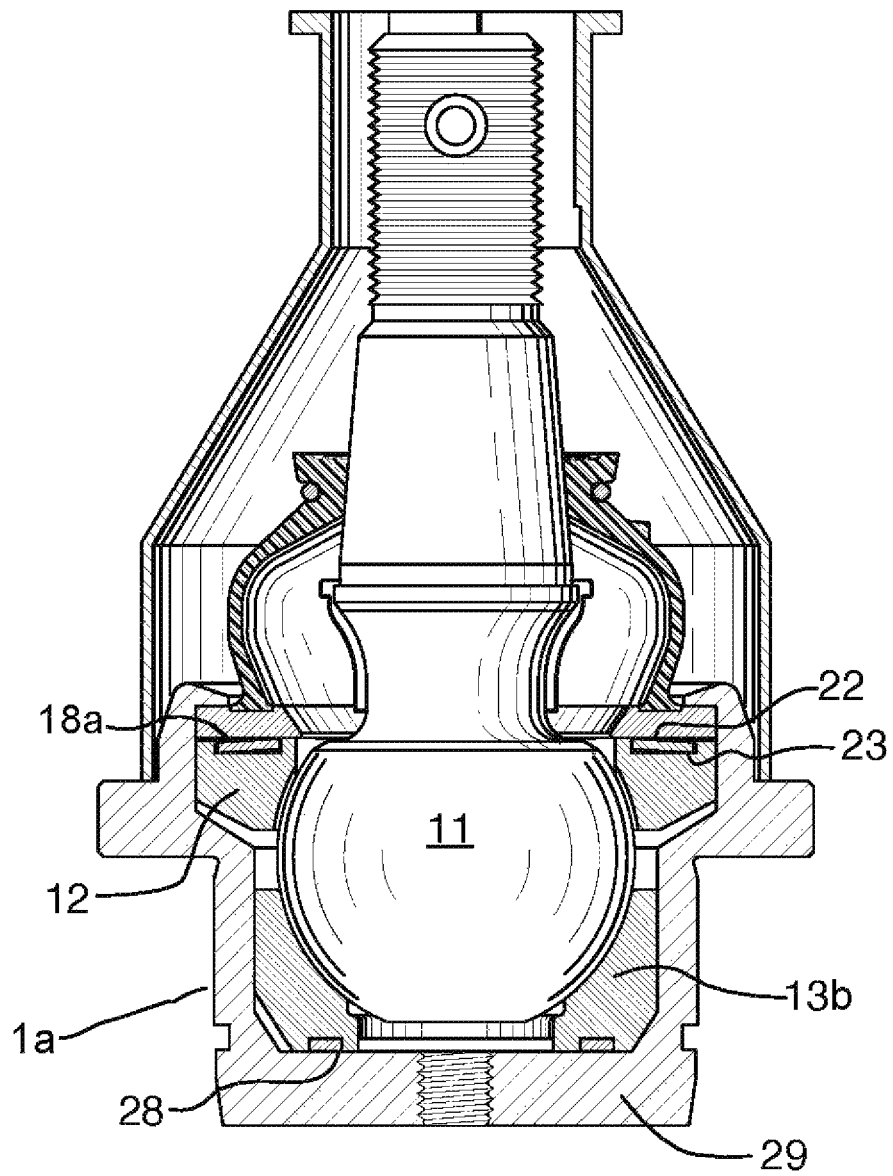

FIGS. 5a and 5c show the disc springs 22 and 28 located in an annular recess within the upper and lower bearings. In FIG. 5a the outside edge of the disc spring 22, 28 is restrained while in FIG. 5c the inside and outside edges are restrained within the annular recess. In FIG. 5b the inside edge of the disc spring 22 is restrained by the annular recess 23 while the outside edge is restrained by the housing 1a. In FIG. 5b the lower disc spring 28 is located in an annular recess formed in the end wall 29 of the housing 1a.

FIGS. 6 and 7a-d show the third and fourth examples that also include the elements of the invention in other ball joint configurations. In all examples, a disc spring is housed in an annular recess to spring load at least one bearing into close engagement with a ball end. The relative dimensions of the spring and annular recess serve to avoid overstressing and excessive deformation of the spring are illustrated by the examples in FIGS. 8-9.

Figure 6:
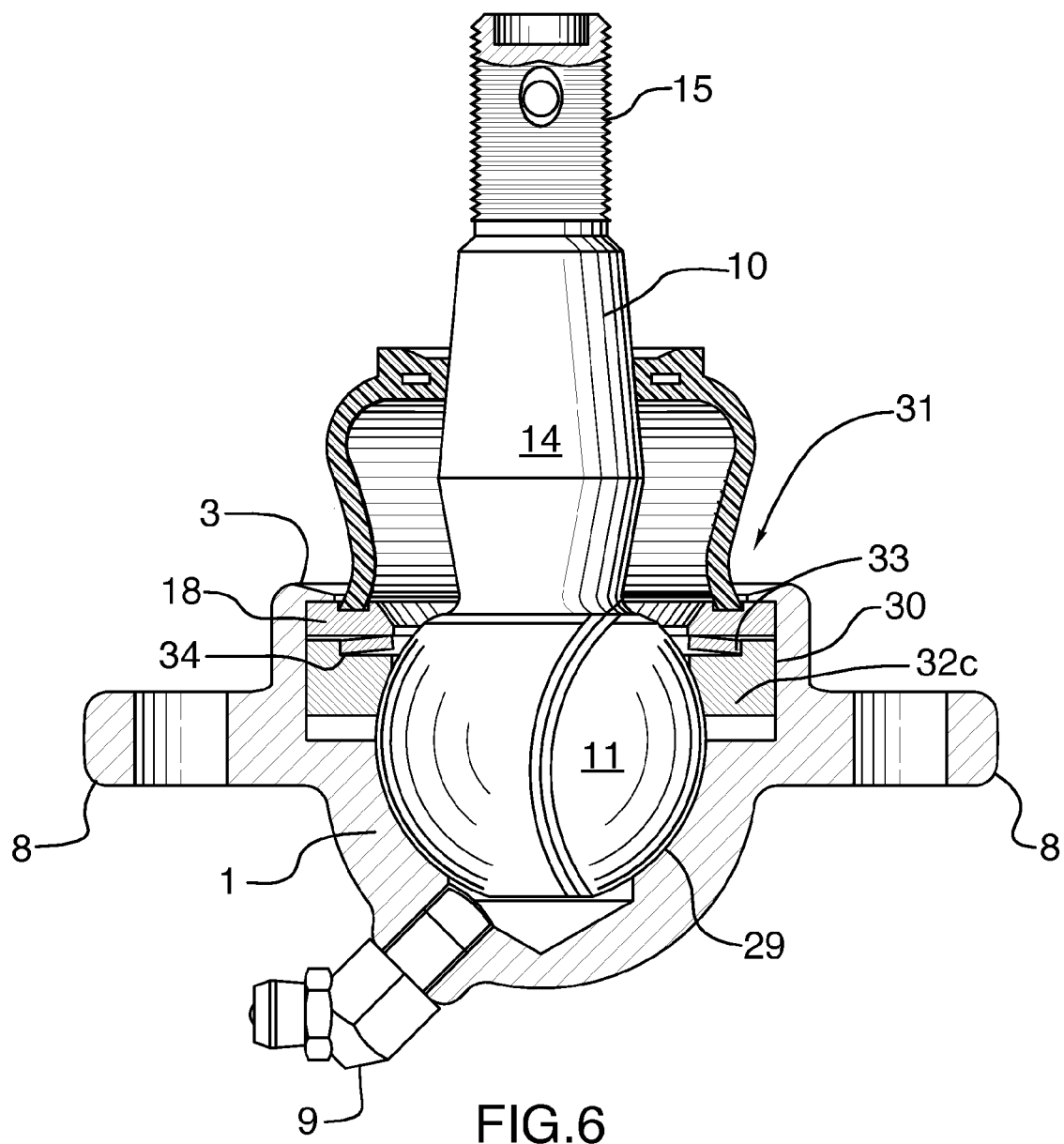
FIG. 6 is an axial partial sectional and cut-away view through a third example configuration of a ball joint as described below having a spring loaded upper bearing.

FIG. 6 shows a third example having generally common elements with the previously described examples. In general terms, the third example of the ball joint in FIG. 6 has a housing 1c with a flange 8, and a grease inlet 9. The housing 1c has an inner cavity defined inward of a hemispherical seat end 29, a side wall 30 and a closure end 31. The closure end 31 of the housing 1c also has an opening with an edge 3c about the opening in an assembly position extending upwardly (not shown but similar to FIG. 3). The ball stud 10 has a lower ball end 11 with an outer convex spherical surface, a middle portion 14, and a connector end 15.

The third example in FIG. 6 shows only an upper or first bearing 32c axially slidably housed within the cavity, and having an inner concave spherical surface matching the ball end 11. A retention plate 18c is housed within the cavity inward of the edge 3c about the housing opening. The edge 3c of the opening extends inwardly engaging an outer surface of the retention plate 18c in the closed position shown. A first disc spring 33 is disposed in a first disc annular recess 34 in at least one of: an outer surface of the first bearing 32c; and an inner surface of the retention plate 18c. The third example illustrated in FIG. 6 shows the first option and it will be apparent that a recess can be equally formed into the opposing inward surface of the retention plate 18c as illustrated in retention plate 18d in FIG. 9 for example. The functioning of the first disc spring 33 of FIG. 6 is identical to the upper disc spring 22 of FIGS. 1-2.

FIGS. 7a-7d show a fourth example also having generally common elements with the previously described examples. The fourth example of the ball joint in FIGS. 7a-d has a housing 1d without a flange, and has a grease inlet 9 in the bottom retention plate 18d. The housing 1d has an inner cavity defined inward of a partially spherical seat end 29, a side wall 30 and a closure end 31. The closure end 31 of the housing 1d also has an opening with an edge 3d about the opening in an assembly position extending downwardly (not shown but similar to FIG. 3). The ball stud 10 has a lower ball end 11 with an outer convex spherical surface, a middle portion 14, and a connector end 15 with a nut 26 secured with a pin 27.

Figure 7B:
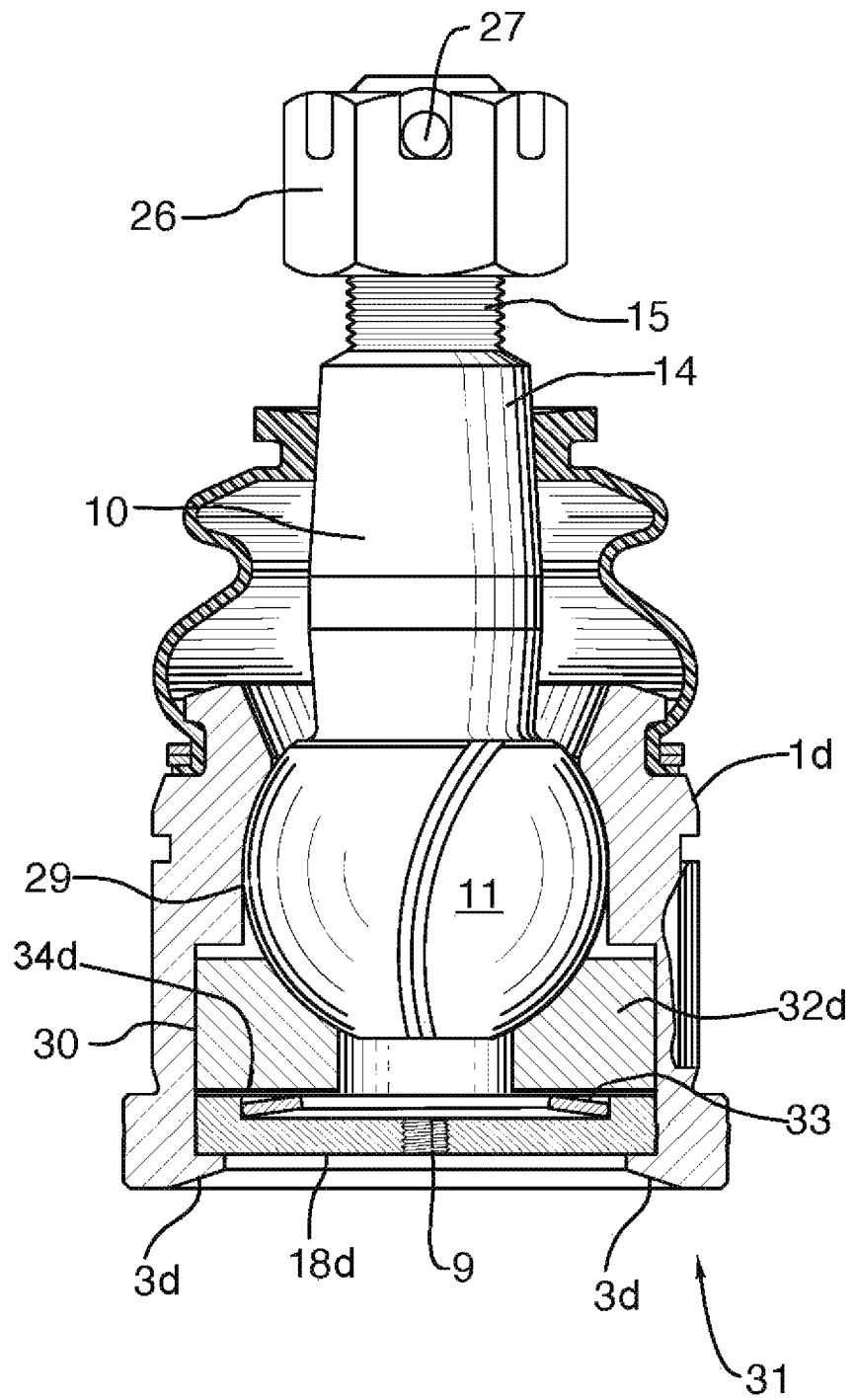
Figure 7C:
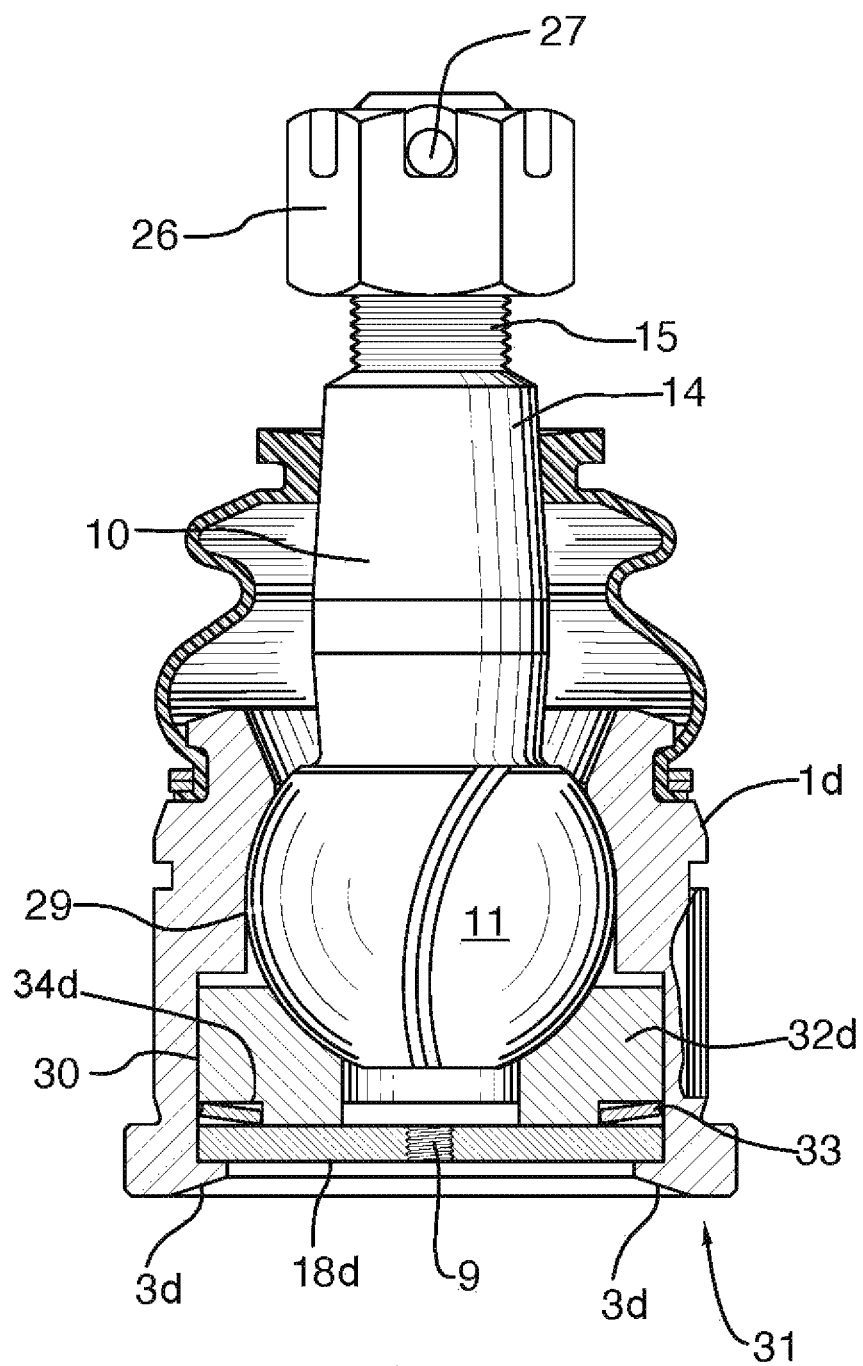
Figure 7D:
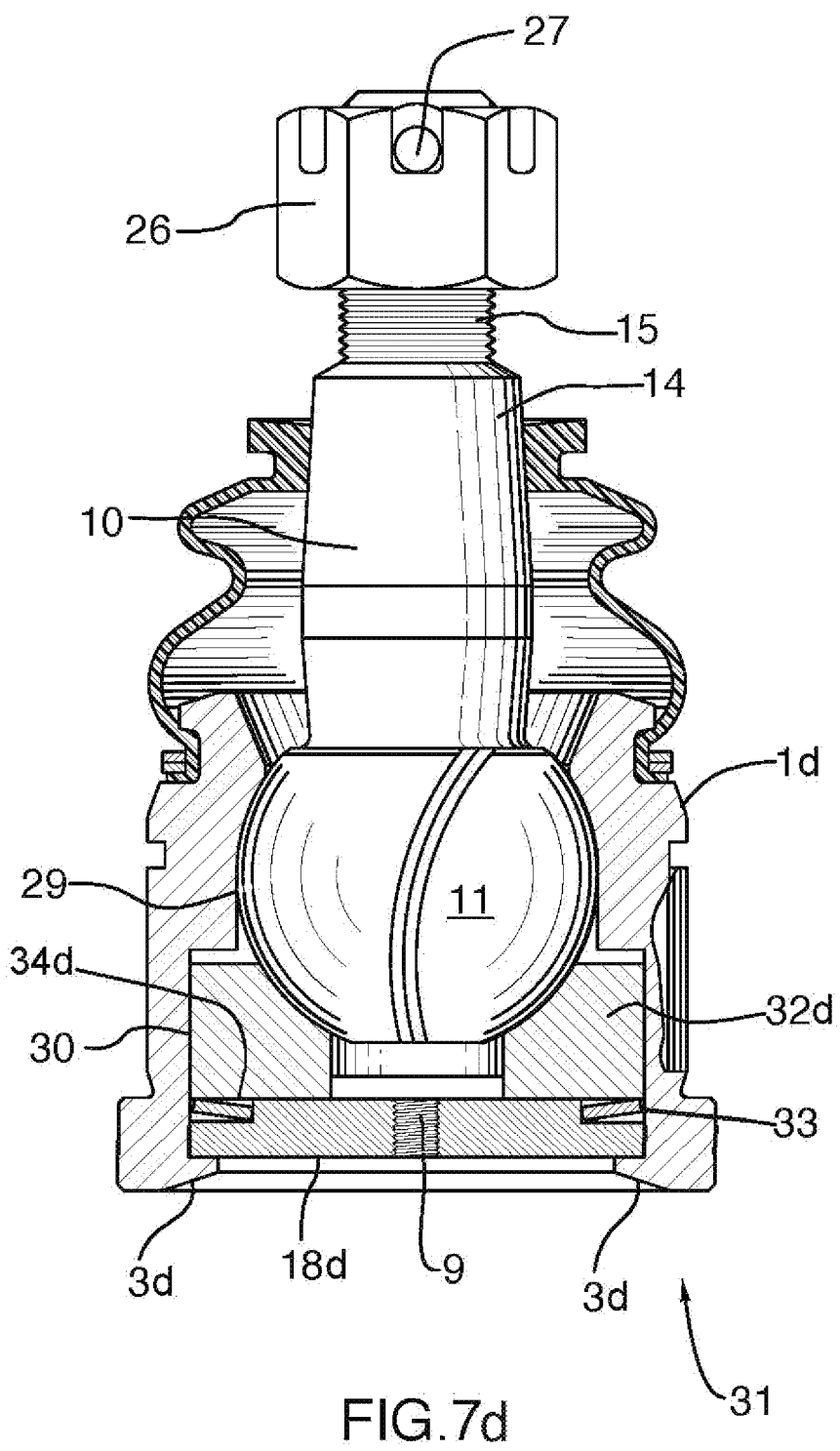

The fourth example in FIGS. 7a-7d shows only a lower or first bearing 32d axially slidably housed within the cavity, and having an inner concave spherical surface matching the ball end 11. The retention plate 18d is housed within the cavity inward of the edge 3d about the housing opening. The edge 3d of the opening extends inwardly engaging an outer surface of the retention plate 18d in the closed position shown in FIGS. 7a-7d. A first disc spring 33 is disposed in a first disc annular recess 34d in at least one of: an outer surface of the first bearing 32d (FIGS. 7a, 7c, 8 and 10); and an inner surface of the retention plate 18e (FIGS. 7b, 7d and 9). The outside edge of the disc spring 33 is restrained in the examples show in FIGS. 7a, 7b, 8 and 10. The inside edge of the disc spring 33 is restrained in the examples show in FIGS. 7c, and 7d, while both the inside and outside edges of the disc spring 33 are restrained in the example shown in FIG. 9.

Figure 8:
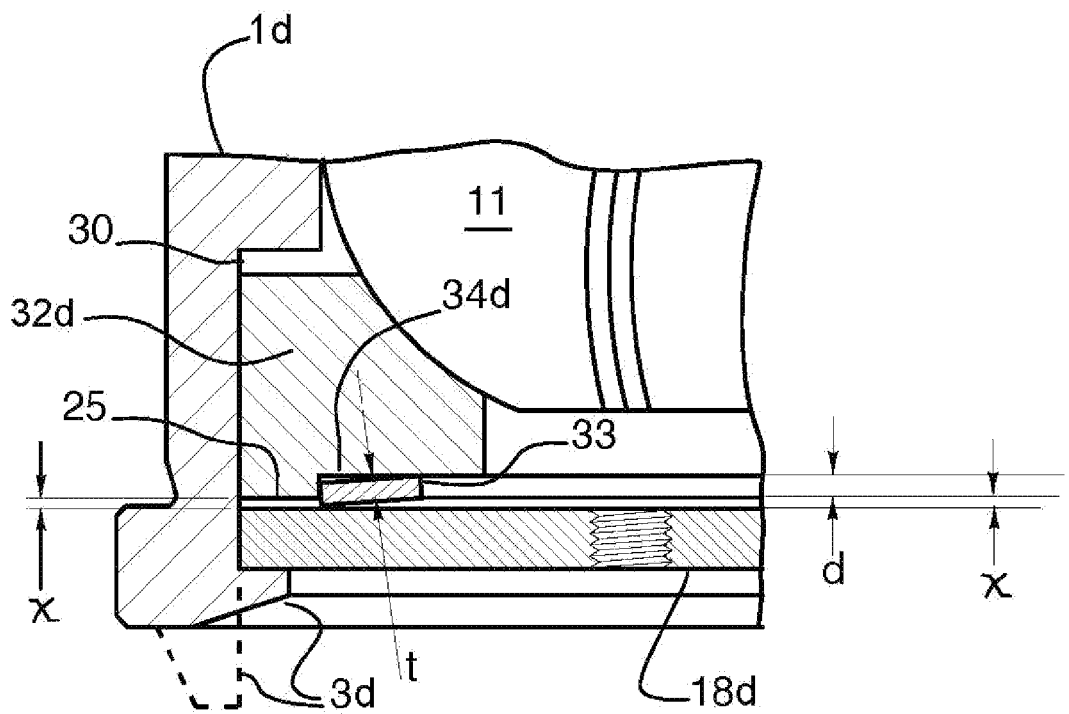
FIG. 8 is a detail axial sectional view, of the configuration of FIG. 7, showing the disc spring within the annular recess in the spring loaded axially sliding lower bearing and in particular the relationship between the depth of the annular recess, the compressed height of the disc spring and the small gap between the lower bearing and the lower retention plate, that together permit a degree of relative movement under resilient spring loading while also preventing overstressing of the disc spring to extend the cycle life of the disc spring.
Figure 9:
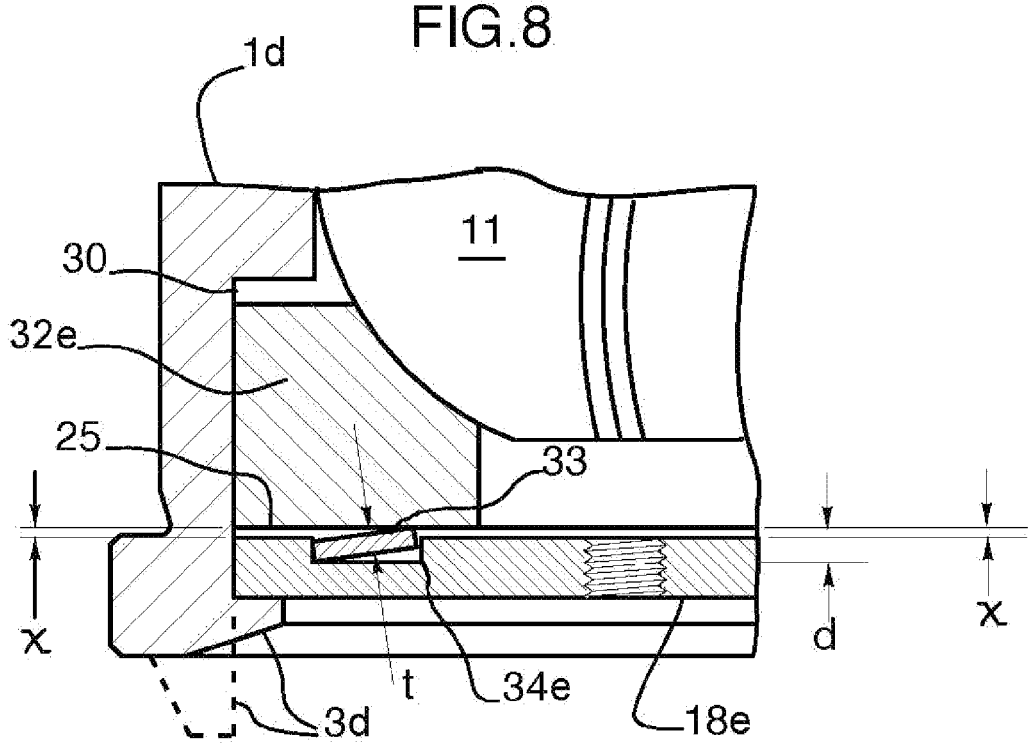
FIG. 9 is an alternative arrangement similar to detail axial sectional view of FIG. 8, showing the disc spring within the annular recess in the retention plate.

FIG. 8 shows an annular recess 34d formed into the lower surface of the first lower bearing 32d. FIG. 9 shows an annular recess 34e formed in the inward surface of the retention plate 18e. The functioning of the first disc spring 33 of FIGS. 8 and 9 are identical to the upper disc spring 22 of FIGS. 1-2.

As indicated in FIGS. 8-9 the first disc spring 33 has a minimum thickness "t" and the first annular recess 34d, 34e has a depth "d" greater than the disc minimum thickness "t". The conical shape of the first disc spring 33 provides a predetermined force-displacement profile which is maintained within an elastic range by selecting a recess of sufficient depth "d". The shoulder 25 provides an abutment stop to prevent overloading of the spring 33. A gap "x" between the retention plate 18d, 18e and the bearing 32d, 32e in a preload condition provides for sufficient motion of the bearing 32d, 32e to allow the spring 33 to operate, while preventing excessive motion that could overstress the spring 33. Under excessive force, the shoulder 25 abuts against the inside surface of the retention plate 18d, 18e and the axial deformation of the spring 33 is limited to the depth "d" of the annular recess 34d, 34e which is selected to ensure that the deformation of the spring 33 remains within the elastic stress range.

For example during the rolling over of the edge 3d, high forces are required to plastically deform the edge 3d from the initial position (dashed lines) to the closed position (solid lines). During rolling of the edge 3d the shoulder 25 abutting the retention plate 18d, 18e ensures that the spring 33 is not overstressed. As shown in FIGS. 1-5a-c, the upper bearing 12 has a larger diameter than the lower bearing 13a-13b in order to spread the load and reduce stress on the upper bearing 12 when the edge 3a is rolled over to close the ball joint. An increased diameter for the upper bearing 12 provides a larger shoulder 25 to bear the load imposed by closing the edge 3a. The size of the lower bearing 13a, 13b is limited by the equipment into which the housing 1a is positioned on a vehicle for example, whereas the upper portion of the housing 1a is less limited by any adjacent structures.

Figure 10:
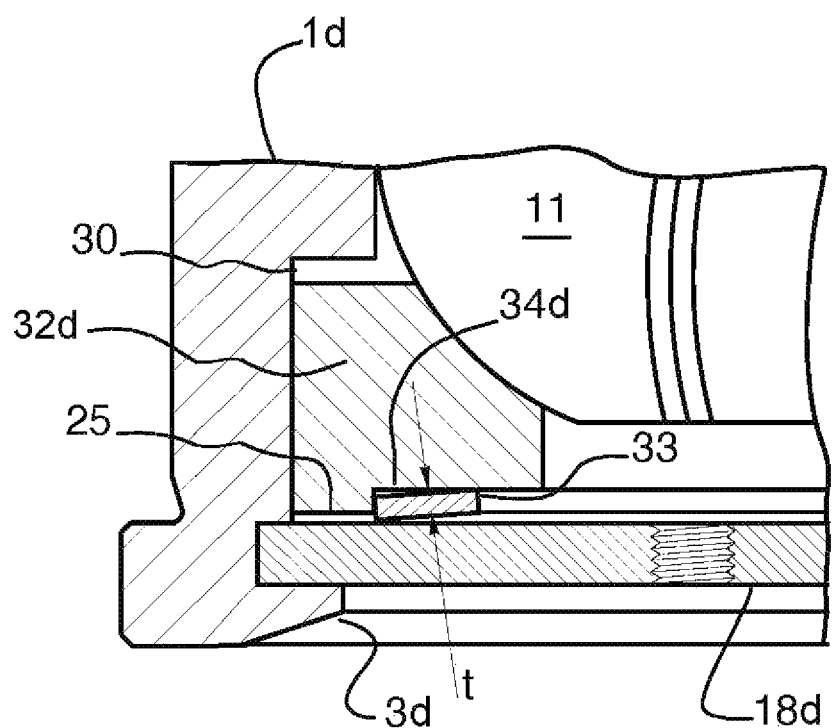
FIG. 10 is an alternative arrangement similar to detail axial sectional view of FIG. 8, showing the retention plate retained in a circumferential groove in the housing.

As shown in the example of FIG. 10, apart from using a shoulder 25 to limit compressive stress on the disc spring 33 during rolling of the edge 3d, the outer edge of the retention plate 18d can be located in a lateral groove within the housing 1*d*. The compressive stress on the retention plate 18*d* during rolling of the edge 3*d* is transferred to the housing 1*d* in the example of FIG. 10.

The bearings 12, 13*a*-13*b*, 32*c*-32*e* can be formed by sintering or can be machined to provide an annular recesses 23, 34*c*-34*e* with a very accurate depth "d" and diameter. The positioning of the springs 22, 28, 33 symmetrical to the central axis of the ball joint within the recesses 23, 34*c*-34*e* ensures that the springs 22, 28, 33 remain centrally located. Lateral displacement of the springs 22, 28, 33 or bearings 12, 13*a*-13*b*, 32*c*-32*e* could result in unbalanced loading or stress concentrations which damage the components and reduce the cycle life of the ball joint.

Although the above description relates to a specific preferred embodiment as presently contemplated by the inventor, it will be understood that the invention in its broad aspect includes mechanical and functional equivalents of the elements described herein.

We claim:

1. A ball joint comprising:
    a housing having an inner cavity defined inward of a seat end, a side wall and a closure end having an opening, an edge about the opening in an assembly position extending upwardly;
    a ball stud having: a lower ball end with an outer convex spherical surface, a middle portion, and a connector end;
    a first bearing, slidably housed within the cavity, having an inner concave spherical surface;
    a retention plate, housed within the cavity inward of the edge about the opening, wherein the edge of the opening extends inwardly engaging an outer surface of the retention plate in a closed position;
    a first disc annular recess disposed in at least one of: an outward surface of the first bearing; an inward surface of the retention plate; and an inward surface of the seat end of the housing, and
    a first disc spring disposed in the first disc annular recess, the first disc annular recess laterally restraining at least one of: an outer circular edge of the first disc spring; and an inner circular edge of the first disc spring, during compression of the first disc spring, and a peripheral annular shoulder adjacent the first disc annular recess axially limiting axial movement, between the outer surface of the first bearing; and one of: the inner surface of the retention plate; and the inward surface of the seat end of the housing, thereby limiting compression of the first disc spring.

2. The ball joint according to claim 1 wherein the first disc spring has a minimum thickness and wherein the first annular recess has a depth greater than the disc minimum thickness.

3. The ball joint according to claim 1, comprising:
    a second bearing housed within the cavity, having an inner concave spherical surface, the second bearing spaced a distance from the first bearing.

4. The ball joint according to claim 3 wherein the seat end comprises an abutment wall of the housing, an inner surface of the abutment wall engaging an outer surface of the second bearing.

5. The ball joint according to claim 4 comprising a second disc spring disposed in a second disc annular recess in at least one of: the outer surface of the second bearing; and the inner surface of the abutment wall.

6. The ball joint according to claim 3 wherein the first bearing has an outer diameter greater than an outer diameter of the second bearing.

7. The ball joint according to claim 1 wherein the seat end of the housing comprises an inner concave spherical surface.

8. The ball joint according to claim 1, comprising a flexible dust boot having an outer end surrounding the middle portion of the ball stud.

9. The ball joint according to claim 8, wherein the flexible dust boot has an inner end sealed to retention plate.

10. The ball joint according to claim 9 wherein the outer surface of the retention plate has a boot annular recess in which the inner end of the dust boot is retained.

11. The ball joint according to claim 8 wherein the outer end of the dust boot has a boot annular recess in which a flexible ring is disposed.

12. The ball joint according to claim 1 wherein the housing includes a flange extending laterally outward from the side wall of the housing.

13. The ball joint according to claim 1 wherein, the first disc annular recess and the first disc spring are disposed in an inside portion of the first bearing, and an outside portion of the first bearing defines the peripheral annular shoulder.

14. The ball joint according to claim 1 wherein, the first disc annular recess and the first disc spring are disposed in an inside portion of the retention plate, and an outside portion of the retention defines a peripheral shoulder.

15. The ball joint according to claim 1 wherein the retention plate has a beveled inner opening and the middle portion of the ball stud has a concave profile.

16. The ball joint according to claim 1 wherein the housing includes a lateral groove inward of the edge of the housing engaging an outer edge of the retention plate.

* * * * *